July 29, 1924.

F. DEFLASSIEUX 1,502,909

ASYNCHRONOUS MOTOR

Filed Sept. 3, 1921    2 Sheets-Sheet 1

Inventor:
F. Deflassieux,
by Albert E. Davis
His Attorney.

July 29, 1924.

F. DEFLASSIEUX

ASYNCHRONOUS MOTOR

Filed Sept. 3, 1921

Inventor:
F. Deflassieux,
by Albert G. Davis
His Attorney.

Patented July 29, 1924.

1,502,909

UNITED STATES PATENT OFFICE.

FLEURY DEFLASSIEUX, OF PARIS, FRANCE, ASSIGNOR TO GENERAL ELECTRIC COMPANY, A CORPORATION OF NEW YORK.

ASYNCHRONOUS MOTOR.

Application filed September 3, 1921. Serial No. 498,446.

*To all whom it may concern:*

Be it known that I, FLEURY DEFLASSIEUX, a citizen of France, residing at 364 Rue Lecourbe, Paris, France, have invented certain new and useful Improvements in Asynchronous Motors (for which I have filed applications in France June 1, 1920, Patent No. 516,216. application #127,703), of which the following is a specification.

The present invention applies to alternating current motors of the asynchronous type, and relates particularly to the starting of squirrel-cage motors by switching the connections of the windings of the stator corresponding to the various phases.

The following description relates particularly to squirrel-cage motors with polyphase windings, for example three-phase windings, arranged in such a manner as to start by connecting the phases of the stator, first in star for starting, and second in delta for normal operation. The "star-delta" system gives sufficiently good results for small motors, but when the power of the machines is quite high, the great starting current absorbed by the stator demand the use of autotransformers which permit feeding the motor at reduced voltage. These starters of the static type involve complications and are quite high in price which is rendered unjustifiable by the short duration of their service, since they are used only in the starting of the motors.

The object of the invention is to perfect the "star-delta" connection and to make a more rational and more complete application of the principle of this method of starting, permitting a better gradation of operation as the motor passes from the position of rest to full normal operation.

Figure 5:
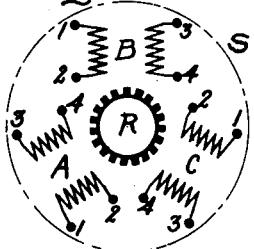
Figure 6:
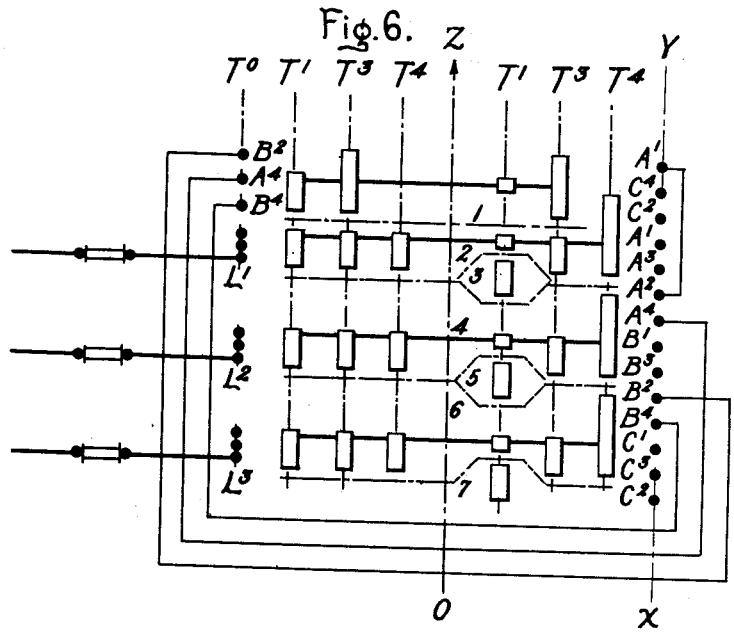
Figure 7:
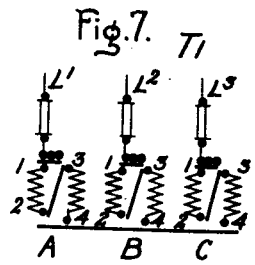
Figure 8:
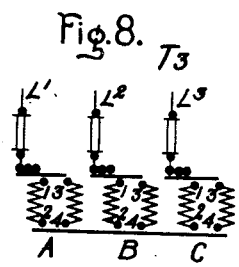
Figure 9:
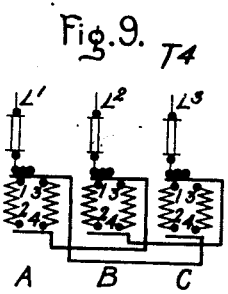

For a better understanding of my invention, reference is to be had to the following specification, together with the accompanying drawings, in which Figures 1, 2, 3, and 4 are wiring diagrams of a three-phase stator showing the various steps in the starting period; Fig. 5 represents diagrammatically the relative arrangement of rotor and stator in a motor embodying my invention; Fig. 6 is a developed diagram of a circuit controller used for making the starting connections; and Figs. 7, 8, and 9 are wiring diagrams of the connections made by the starting switch during various stages of its operation.

Figure 1:
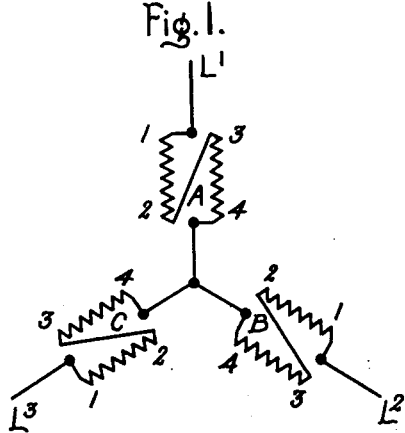

In its application to a motor comprising a squirrel-cage rotor and a three-phase-wound stator, the system which forms the subject matter of the invention is based on the principle of the division of each phase of the stator windings into two distinct windings, which may be connected in different ways during the starting of the motor with a view to obtaining the combinations of windings enumerated below:

(1) The winding of each phase being divided into two distinct sections, these two sections are first connected in series, and the three phases thus obtained are connected in star (Fig. 1).

Figure 2:
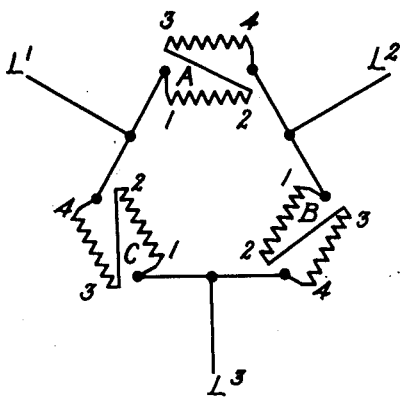

(2) The two sections composing the winding of each phase remaining connected in series as before, the three phases thus obtained are connected in delta (Fig. 2).

Figure 3:
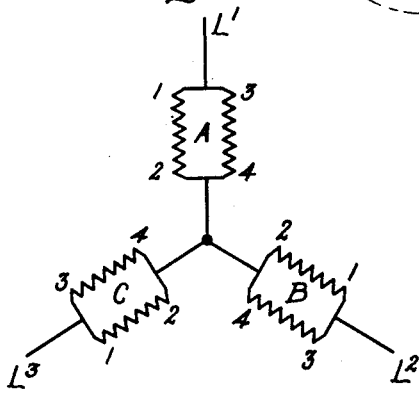

(3) The two sections of the windings of each phase being afterward connected in parallel, the three phases thus constituted are connected in star (Fig. 3).

Figure 4:
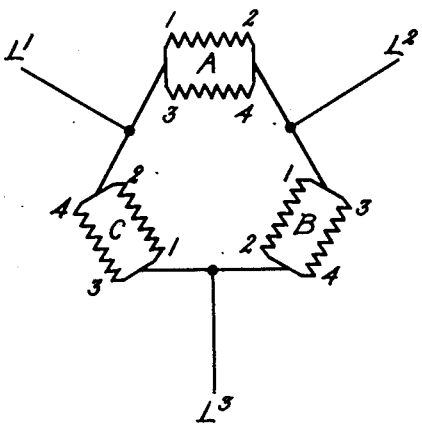

(4) Finally, the two sections composing the winding of the respective phases remaining connected in parallel, the three phases are connected in delta (Fig. 4).

This last mode of connection is that which causes the three-phase windings of the stator to operate at a minimum of impedance and which corresponds to the normal operation of the motor.

The first three combinations on the contrary give to these windings progressively decreasing impedances, from the first to the last, so that, for a given line voltage taken from the distribution system without a transformer, the four combinations mentioned would give rise to current consumptions having the following relative values:

(1) For connecting in star the three-phase windings of the rotor with half-phases in series: $\frac{1}{4 \times 3}$ (2) For connecting in delta the three-phase windings of the rotor with half-phases in series: $\frac{1}{4}$ (3) For connecting in star the three-phase windings of the rotor with half-phases in parallel: $\frac{1}{3}$ (4) Finally, for connecting in delta the three-phase windings of the rotor with half-phases in parallel: I, this being the relative current intensity absorbed by the motor at rest under full voltage.

The starter shown in Fig. 6 makes only three of the connections enumerated above; the first, third and fourth (Figs. 7, 8 and 9). It would be possible without more complications, to arrange the starter in such a manner as to obtain the connections 2, 3 and 4, instead of 1, 3 and 4. It would also be possible, by slightly modifying the starting device shown in Fig. 6 and providing it with four notches, instead of three, to obtain all the four "star-delta" connections enumerated hereinbefore.

The three connections represented in Figs. 7, 8 and 9 are sufficient for most applications, but the indications given on the starter which permit these connections to be made are not limiting in character and by no means exclude the use of controllers making more numerous connections, all of which have the principle of the application of "star-delta" starting, but which admit of any other method of subdividing the windings of the different phases of the stator.

By using only three steps, which are sufficient for most applications, a starter is obtained, as is shown in Fig. 6, of simple construction, small bulk, and one which may form a part of the motor if it is mounted directly on the frame of the machine.

In all of the figures the windings of the stator of the asynchronous motor are designated, for the three respective phases of the motor, by the letters A, B, C. The conductors of the three phases corresponding to the supply system are designated respectively by $L^1$, $L^2$ and $L^3$.

As shown by Figs. 1 to 4, each of the phases A, B or C is subdivided into two sections, the windings of which are designated respectively by the figures 1—2 and 3—4.

In Fig. 1, the terminals 2 and 3 of the sections corresponding to each of the phases are connected together through the starter which connects the terminal 1 of the first phase conductor to the line $L^1$, the terminal 1 of the second phase winding to the line $L^2$, the terminal 1 of the third phase winding to the line $L^3$; this is the "star-series" connection with which the starting operation begins as the starter passes from the position of rest to the first operating position.

The connections shown diagrammatically in Fig. 2 would correspond to the same connection, in series, of the elements 1—2 and 3—4 of each phase, but would correspond to the "delta-series" connection of the three phases. The starter of Fig. 6 omits this connection. On the other hand, this starter, in its second working position, gives the "star-parallel" connection represented in Fig. 3, which connection is such that the sections 1—2 and 3—4 of each phase are in parallel, and the three phases are in star with the conductors $L^1$, $L^2$ and $L^3$ of the supply system. Finally, the starter, in its third working position or position of normal operation, produces the "delta-parallel" connection shown diagrammatically in Fig. 4, which connection, like that of Fig. 3, is such that the sections 1—2 and 3—4 of each phase are in parallel and these phases are in delta with the conductors $L^1$, $L^2$ and $L^3$ of the supply system.

In Fig. 5 is shown diagrammatically at R the rotor of the squirrel-cage asynchronous motor, which does not have any electrical connection with the exterior. Concentrically to this rotor is shown diagrammatically the stator S, upon which are suitably distributed the three-phase windings A, B, C, subdivided in such a manner that each of the phases includes two sections or half-phases 1—2 and 3—4. In this figure are shown only in a diagrammatic manner, the essential elements which should be comprised in the asynchronous motor in view of the starting system which forms the object of the invention, the figure showing neither the supply lines of the motor nor the connections to be made between the phases and the sections composing the phases.

The connections of the windings among themselves and the phases with the lines are indicated in detail in Figs. 7, 8 and 9, and these figures show how the starter shown in Fig. 6 makes these various connections.

The characteristics of the construction of this starter (Fig. 6) are similar to those of a controller arranged so as to make desired connections by means of a cylinder of the ordinary kind, that is to say, a cylinder rotating about its axis and carrying with it in its rotation several contacts insulated from each other and arranged in such a manner as to come in contact with stationary rubbing contacts composing two distinct groups placed parallel to the cylinder and near its periphery. The first group of stationary contacts coresponds, as shown in Fig. 6, to the conductors $L^1$, $L^2$, $L^3$ coming from the feed line of the motor and to three contacts $A^4$, $B^2$, $B^4$ corresponding to certain temrinals of the windings of the stator. The second group of stationary contacts on the line XY correspond to the terminals of the different windings of the stator.

The cylinder of the starter is shown developed, according to the custom which has become classic in the representation of controllers. According to one of the lines ($T^0$) is indicated the position of the starter for which the apparatus makes no connection of the elements, among themselves or with the line. According to a second line ($T^1$) is indicated the position which corresponds to the first starting notch, or "star-series" connection. According to a third line ($T^3$) is indicated the position which corresponds to the "star-parallel" connection. According to a fourth line (T⁴) is indicated the position which corresponds to the third working notch or normal operation of the motor, the windings then being connected "delta-parallel".

Although the series of stationary contacts corresponding to the windings of the motor, $A^2$, $C^2$, $C^4$, etc., are represented at the right of the figure, these contacts should be vertically arranged according to the position indicated by the line O—Z drawn (Fig. 6) in the center of the development of the starter. For greater clearness the contacts have been drawn toward the right on line X—Y, in order to arrange the letters designating the stationary contacts of the starter outside the drawing which represents the device in development. Dot-dash lines, disposed transversely, give a diagrammatic idea of the different sections 1 to 7 composing the device, the sections being insulated from each other and superposed upon each other.

It is proper to point out that the ends of the windings of each phase are directly connected to the terminals of the starter, this having the double advantage of avoiding possible errors and of diminishing the length of the cables passing out.

To sum up, the present invention has for its object the starting of alternating-current motors, and in particular three-phase asynchronous squirrel-cage motors, by means of a system of connections which is an improvement on the "star-delta" system. Each of the stator windings is divided into two sections, and a starter makes several combinations between the elements composing the three phases of the stator and between the phases and the distribution network. The connections made, are, in principle, the following: "star-series", "delta-series", "star-parallel" and "delta-parallel".

In the application given as an example, the starter makes only the connections "star-series", "star-parallel" and "delta-parallel". Under these different forms of application, and in particular in those described in the patent, the invention makes it possible to start asynchronous squirrel-cage motors without any exterior apparatus except a switch, while consuming a current less than that of full load, a result which would have necessitated the use of an auto-transformer in the systems heretofore employed. The combination of the series-parallel control and the star-delta control is especially beneficial since the gradations obtained by this method in starting are small enough even for large size motors.

Although only one method of putting the invention into execution has been shown, it should be understood that, without departing from the spirit and scope of the patent, various modifications of form may be adopted, having the same principle and the same object as the devices referred to above, and consequently coming, like the latter, within the scope of the invention.

What I claim as new and desire to secure by Letters Patent of the United States, is,—

1. The method of starting a squirrel cage polyphase motor having a plurality of sections in each of its stator phases, which consists in first operating the motor with the sections in each phase in series and the phases in star, and then changing, in a plurality of steps to parallel connection of the sections and to delta connection of the phases.

2. The method of starting a squirrel cage polyphase motor having a plurality of sections in each of its stator phases, which consists in first operating the motor with the sections in each phase in series and the phases in star, then operating the motor with the sections in each phase in parallel and the phases in star, and lastly operating the motor with the sections in each phase in parallel and the phases in delta.

In witness whereof, I have hereunto set my hand.

F. DEFLASSIEUX.